R. H. HASSLER.
EASY RIDING VEHICLE.
APPLICATION FILED SEPT. 22, 1916.
1,211,843.
Patented Jan. 9, 1917.
3 SHEETS—SHEET 2.
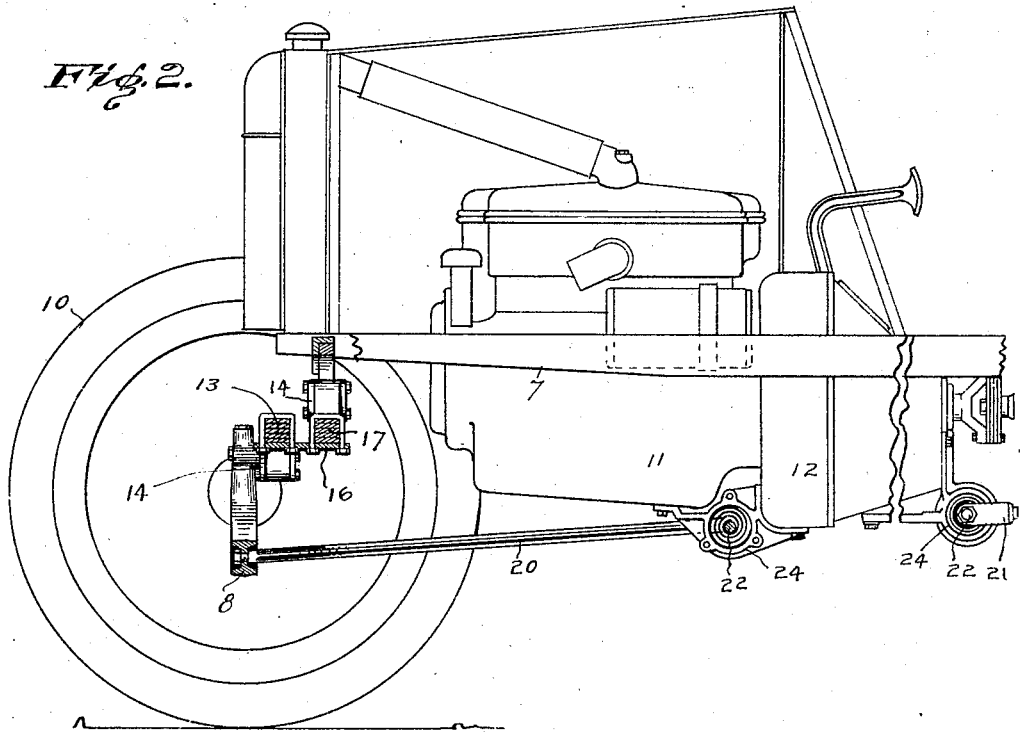
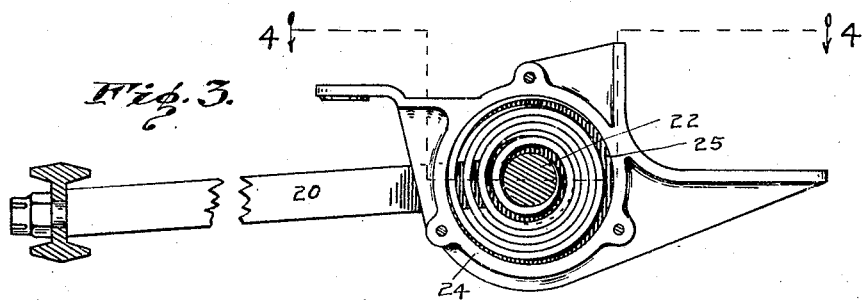
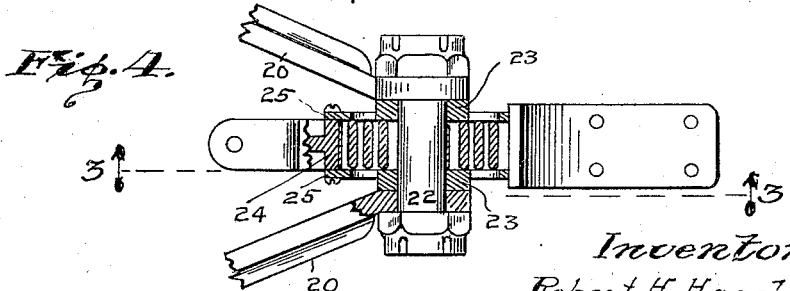
Inventor,
Robert H. Hassler,
By Minturn & Woerner
Attorneys.

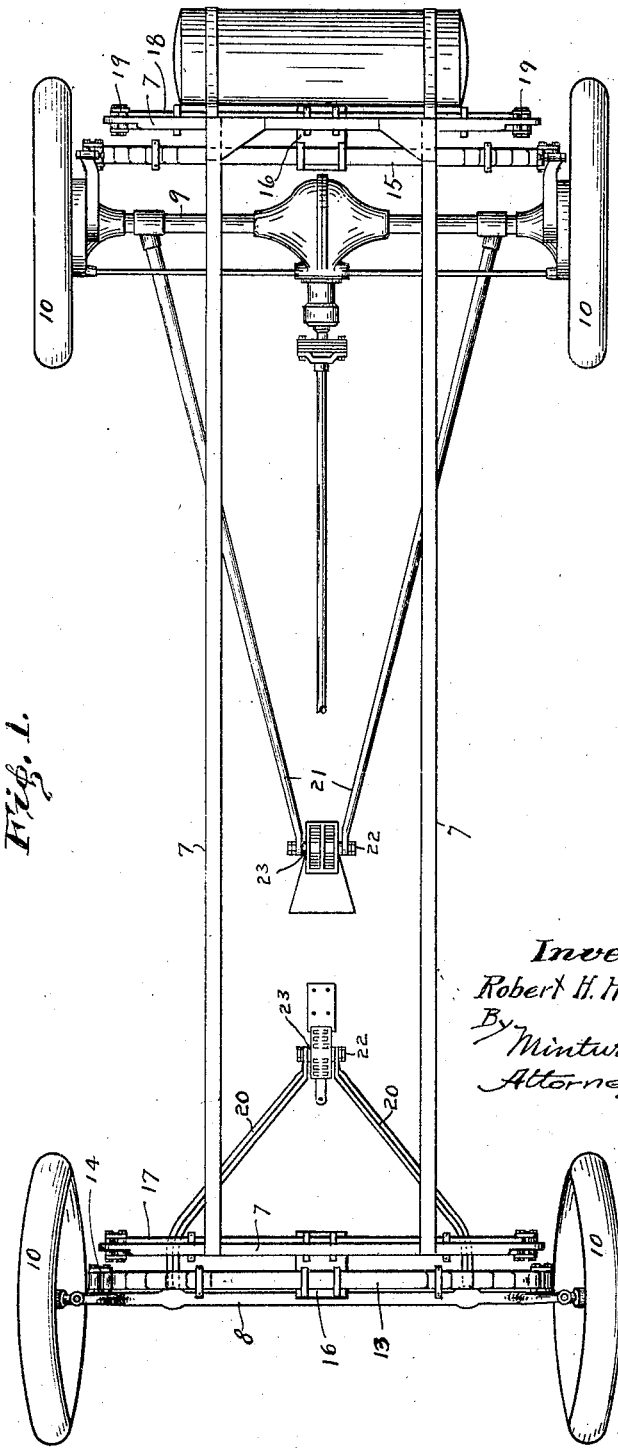

R. H. HASSLER.
EASY RIDING VEHICLE.
APPLICATION FILED SEPT. 22, 1916.

1,211,843.

Patented Jan. 9, 1917.
3 SHEETS—SHEET 3.

Inventor,
Robert H. Hassler,
By Minturn & Worner
Attorneys.

UNITED STATES PATENT OFFICE.

ROBERT H. HASSLER, OF INDIANAPOLIS, INDIANA.

EASY-RIDING VEHICLE.

1,211,843.

Specification of Letters Patent.

Patented Jan. 9, 1917.

Application filed September 22, 1916. Serial No. 121,643.

*To all whom it may concern:*

Be it known that I, ROBERT H. HASSLER, a citizen of the United States, residing at Indianapolis, in the county of Marion and State of Indiana, have invented certain new and useful Improvements in Easy-Riding Vehicles, of which the following is a specification.

The object of this invention is so to combine a plurality of leaf springs that their natural quick actions will interfere with each other and produce a resultant action much slower than said natural ones.

A further object is to absorb the shocks or load impacts by friction between the plates of the leaf springs by imparting twisting actions to the latter under stress.

The ultimate object is to provide a vehicle wherein the shocks incident to travel over rough roads will be much less than would obtain without my invention.

I accomplish the above, and other objects which will hereinafter appear, by the mechanism illustrated in the accompanied drawings, in which—

Figure 5:
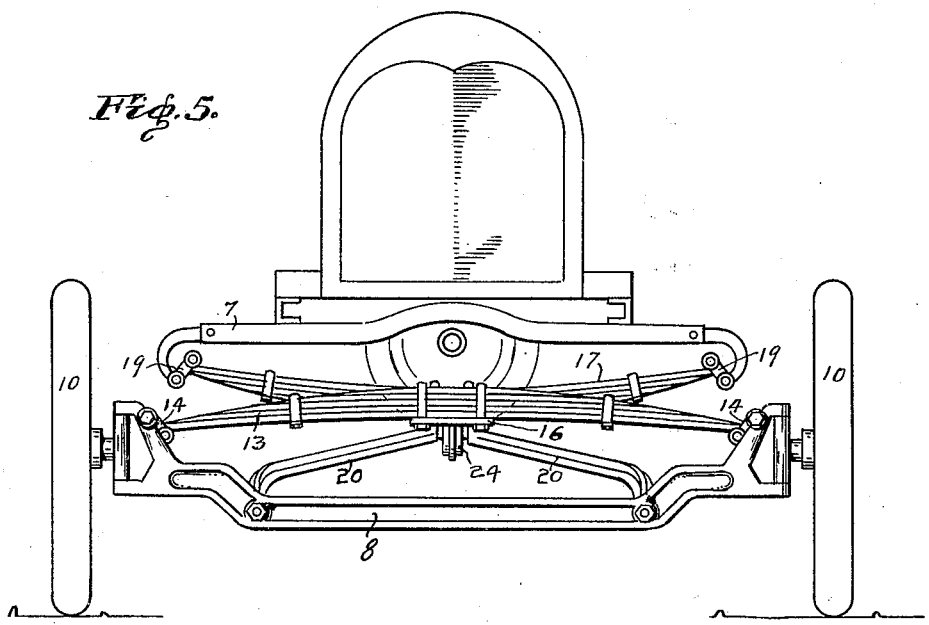
Figure 6:
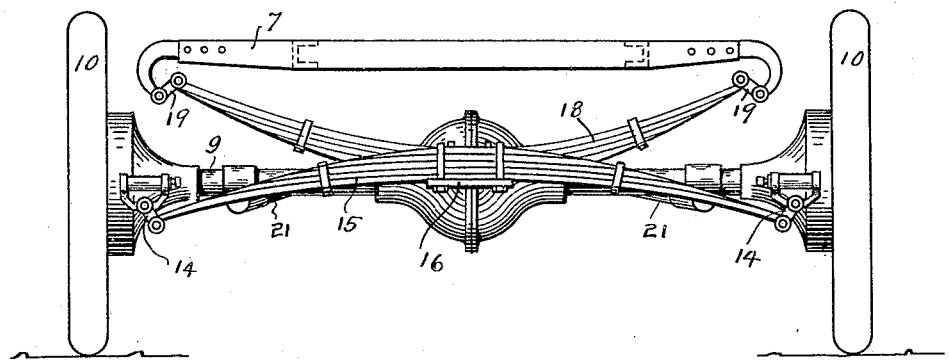

Figure 1 is a top plan view of an automobile chassis with the engine removed and embodying my invention. Fig. 2 is an enlarged detail in elevation and partial vertical section of the front end of an automobile with my invention installed. Fig. 3 is a detail on a still larger scale showing the elastic radius rod attachment in vertical section on the line 3—3 of Fig. 2. Fig. 4 is a view of same on the line 4—4 of Fig. 3. Fig. 5 is a front end elevation of an automobile with my invention and Fig. 6 is a rear end elevation of the chassis.

Like characters of reference indicate like parts throughout the several views of the drawings.

I have shown my invention as applied to an automobile, but it is applicable to motor trucks and other forms of vehicles.

Referring to the drawings, 7 is the frame proper, 8 the front axle, 9 the rear axle, 10 the road-wheels, 11 and 12 the motor and fly-wheel housings, respectively, rigidly attached to the frame and which will be understood as included therein when the frame is hereafter referred to.

My invention comprises a semi-elliptic spring 13 supported by shackles 14, from brackets extending rearwardly of the front axle, and a semi-elliptic spring 15, similarly supported back of the rear axle by shackles from brackets from the rear axle housing. Rearwardly extending horizontal plates 16, 16, are rigidly clipped to the middles of each of the semi-elliptic springs 13 and 15, and the rear ends of these plates support the respective upwardly curved semi-elliptic springs 17 and 18, which are connected by shackles 19, with transverse members of the frame 7.

A pair of front radius rods 20, and rear radius rods 21, have ends rigidly attached to the axle in the case of rods 20, and to the axle-housing for the rear rods 21. The rods of both pairs converge forming V shaped braces. The adjacent ends of each pair are joined by a connecting stud 22, which passes through the inner coil of one or more volute springs,—the drawing shows one spring for the front rods 20 and two volute springs for the rear pair of rods 21—with which coils the studs make a reasonably close fit, and to which coils the adjacent ends of the radius rods are bolted by tightening up nuts on the threaded ends of the studs after placing intervening washers 23.

The volute springs are supported by an annular casing 24 and are retained therein by removable annular plates 25. The casing has flanges for bolting it to the motor or fly-wheel housing members of the main frame. The triangular trusses formed by the radius rods, by being rigidly fastened at their ends opposite the volute springs, have three different actions on the latter, (1) in a radial direction pressing the convolutions toward each other with gradual cumulative effect, (2) in an axial direction telescoping the convolutions through each other and (3) subjecting the spring to a torsional strain as when the inner coil is thrown on an angle with the outer coil.

It will be noted that the two-semi-elliptic springs supported by each axle are off-set from the axle, and also from each other, one tendency of which is to rock the axle on its spindle, thereby transmitting more stress to the volute springs at the resilient connections of the radius rods. This conduces to the easy riding qualities of the vehicle, which result from several different causes than the one mentioned, something as follows: First,—the characteristic action of each leaf spring interferes with the natural characteristic action of the adjacent leaf spring in such a way that the combined action of the two is very slow. The natural quick oscillations of each spring are lost by the interference of one on the other. This interference is due to the fact that the two springs are forced to oscillate about the same center—at the inner ends of the rods—on different radius lengths. Second,—the load of the car, and the radius-rod action, produce a twisting strain on the two adjacent leaf springs by reason of their being in different vertical planes. This twisting action is in combination with the natural flexure of the springs in their vertical planes and gives more friction between the plates thereby helping the slowness of oscillation. Third,—the twisting action above referred to, is further increased by the resilient radius rod ends. The off-set leaf springs are given a greater twist by reason of the radius rod ends being flexible and capable of either horizontal or vertical movement.

Having thus fully described my invention, what I claim as new and wish to secure by Letters Patent of the United States, is—

1. In a vehicle, a frame, an axle, a cross spring shackled to the axle, radius rods connecting the axle with the frame, a second cross spring shackled to the frame, and means rigidly fastening the second spring at its center to the other leaf spring, the two leaf springs being at different distances from the radius rod center.

2. In a vehicle, a frame, an axle, a cross spring, means for supporting the cross spring from the axle, radius rods having means for resiliently connecting the axle with the frame, a second cross spring shackled to the frame and means rigidly fastening it at its center to the other leaf spring, the two leaf springs being at different distances from the radius rod center.

3. In a vehicle, a frame, an axle, radius rods rigidly attached to the axle, resilient means connecting the radius rods with the frame, a pair of cross springs, means for rigidly fastening the cross springs together in different vertical planes, means comprising shackles for securing one of the cross springs to the frame and means comprising shackles for securing the other cross spring to the axle.

4. In a vehicle, a frame, an axle, brackets extending laterally of the axle, radius rods rigidly attached to the axle, resilient means connecting the radius rods with the frame, a pair of cross springs, means for rigidly fastening them together in different vertical planes, means comprising shackles for securing one of the cross springs to the frame, and means comprising shackles for securing the other cross spring to said brackets.

5. In a vehicle, a frame, a pair of axles, a pair of radius rods for each axle rigidly secured thereto at one of their ends, springs connecting the other ends of the radius rods with the frame, a pair of cross springs for each axle, means comprising shackles for supporting one spring of each pair of springs from and to the rear of its adjacent axle, means comprising shackles for connecting the other spring of each pair with the frame, and means for rigidly connecting the centers of each pair of springs together.

6. In a vehicle, a frame, an axle, brackets extending laterally of the axle, radius rods rigidly attached at one of their ends to the axle, volute springs connecting the other ends of the rods with the frame, a pair of semi-elliptic springs, a plate to which the centers of both springs are clipped said springs being in different parallel planes, means comprising shackles securing one of the cross springs to the frame, and shackles securing the other cross spring to said brackets.

In witness whereof, I have hereunto set my hand and seal at Indianapolis, Indiana, this 18th day of September, A. D. one thousand nine hundred and sixteen.

ROBERT H. HASSLER. [L. S.]